(12) United States Patent
Champion et al.

(10) Patent No.: US 8,991,565 B2
(45) Date of Patent: Mar. 31, 2015

(54) DISC BRAKE PISTON CAP AND DISC BRAKE EQUIPPED THEREWITH

(75) Inventors: Pascal Champion, Avrille (FR); Philippe Barret, Paris (FR); François Daguzan, Paris (FR); Thierry Bindner, Colmar (FR)

(73) Assignee: Chassis Brakes International B.V., Amsterdam (NL)

(*) Notice: Subject to any disclaimer, the term of this patent is extended or adjusted under 35 U.S.C. 154(b) by 0 days.

(21) Appl. No.: 14/009,708

(22) PCT Filed: Feb. 1, 2012

(86) PCT No.: PCT/EP2012/051690
§ 371 (c)(1),
(2), (4) Date: Dec. 30, 2013

(87) PCT Pub. No.: WO2012/136397
PCT Pub. Date: Oct. 11, 2012

(65) Prior Publication Data
US 2014/0110906 A1 Apr. 24, 2014

(30) Foreign Application Priority Data
Apr. 4, 2011 (FR) ...................................... 11 01022

(51) Int. Cl.
F16D 55/226 (2006.01)
F16D 65/00 (2006.01)
F16D 55/2265 (2006.01)
F16J 3/04 (2006.01)
F16D 125/08 (2012.01)

(52) U.S. Cl.
CPC .......... F16D 65/005 (2013.01); F16D 2125/08 (2013.01); F16D 55/2265 (2013.01); F16J 3/042 (2013.01); F16J 3/046 (2013.01)
USPC ......................................... 188/72.4; 188/370

(58) Field of Classification Search
CPC ..... F16F 55/226; F16F 65/18; F16F 2125/08; F16J 3/041–3/042
USPC .................................................. 188/370, 72.4
See application file for complete search history.

(56) References Cited

U.S. PATENT DOCUMENTS 4,327,925 A * 5/1982 Alexander et al. ............ 277/636
5,458,344 A * 10/1995 Weiler et al. .................. 277/634
7,097,004 B2 * 8/2006 Barrett et al. ................. 188/72.4

FOREIGN PATENT DOCUMENTS

EP 2208917 7/2010
FR 2657136 A2 * 7/1991

(Continued)

OTHER PUBLICATIONS

Machine Translation of FR 2,657,136 A2.*

(Continued)

Primary Examiner — Anna Momper
(74) Attorney, Agent, or Firm — Michael Best & Friedrich LLP

(57) ABSTRACT

Disc brake piston cap (3) interposed between the caliper (1) and the piston (2) to protect the piston (2). The cap (3) has a bulge (351) on the inner fold (35) which is engaged in the groove (22) of the piston (2), and has an overmolded insert (31) fixed to the annular groove (11) of the caliper. The folded cap (3), with the overmolded insert (31), intermediate folds (33, 34) and an outer fold (32), comprises longitudinal ribs (352) on the face of the inner fold (35) to stiffen this fold and allow air to pass from the inside to the outside around the bulge (351) of the inner fold (35), housed in the groove (22).

11 Claims, 2 Drawing Sheets

(56) References Cited

FOREIGN PATENT DOCUMENTS

FR 2685749 7/1993
FR 2771148 5/1999

OTHER PUBLICATIONS

International Search Report for Application No. PCT/EP2012/051690 dated May 7, 2012 (English Translation, 2 pages).

* cited by examiner

Prior Art

DISC BRAKE PISTON CAP AND DISC BRAKE EQUIPPED THEREWITH

FIELD OF THE INVENTION

The present invention relates to a disc brake piston cap interposed between the caliper and the piston to protect the piston and the bearing surface of the caliper at the mouth of the bore accommodating the piston against attack (from liquids and solids), this cap being made up of a bellows-style concertina-folded boot having an outer edge and an inner edge to be housed in an annular groove of the caliper at the mouth of the bore accommodating the piston, the outer edge of the cap being fixed to the caliper at the outer side of the annular groove and its inner edge being provided with a bulge housed in a groove of the piston.

Such a cap, also referred to as a dust boot or dust gaiter, seals the inside of the brake piston inside the caliper with respect to the outside while at the same time allowing the piston to complete its braking travel and taking account of how this travel evolves as the brake pads gradually wear.

BACKGROUND OF THE INVENTION

Documents FR 90 00550 and FR 2 771 148 already disclose such a disc brake piston cap in the form of a bellows-style dust boot housed in the annular groove at the end of the caliper, beyond the bore for the piston. This cap has a first outer fold of which the outer edge, which is also that of the cap, is fixed to the internal wall of the groove. The outer fold is followed by an intermediate fold and then by a penultimate fold and a last fold which is also the inner fold. The edge of the inner fold is housed in a groove of the piston. The known piston cap is able to move between a refracted position that corresponds to the retracted position of the piston, in which position the various folds are superposed, and a piston-deployed position in which the folds of the cap or boot are deployed axially and in a stepped manner between the groove of the caliper and that of the piston. The cap thus protects the surface of the piston and the bearing surface preventing contact with foreign bodies, liquid and dust.

This known piston cap comprises a re-folding aid to prevent the boot from tearing. This is because particularly when a brake pad is replaced, the piston is pushed back into its bore. It is possible that the cap will fail to fold back correctly in the groove of the caliper. It is then exposed to contact with the metal parts of the brake, the temperature of which may reach high values which, after a certain time, cause the boot to deteriorate. This boot, once torn, is no longer able to protect the inside of the piston against attack by liquid or solid matter, dust or the like.

The known cap depicted in FIG. 3 has five folds ranging from the small diameter to the large diameter: an outwardly directed inner fold 101, an inwardly directed intermediate fold 102, an outwardly directed intermediate fold 103, an inwardly directed intermediate fold 104 and finally an outwardly directed outer fold 105 and an overmoulded insert 106.

SUMMARY OF THE INVENTION

It is an object of the present invention to improve the sealing of the disc brake piston cap that is interposed between the caliper and the piston and to develop means to allow compressed heated air to escape so that:

the cap can fold again correctly when the piston is pushed back into the caliper prior to the fitting of new brake pads, the cap cannot come out of its housing by expanding under the pressure of the trapped hot air, the brake piston can operate freely while at the same time sealing against external elements and not be pushed into a braking position by the pressure of the hot air trapped when the brakes are supposed to be being released.

Explanation and Advantages of the Invention

To this end, one subject of the invention is a disc brake piston cap of the type defined hereinabove, characterized in that the inner fold of the cap faces towards the inside of the caliper and is stiffened by longitudinal ribs on its face that presses against the piston.

By virtue of the inwardly facing stiffened inner fold, the deployment movement occurs between the intermediate folds, so that the inner fold does not deform outwards. That allows the air that has been heated up by the operating temperature of the brake and notably that of the caliper and of the piston to escape between the piston and the inner fold thanks to the favourable way in which the pressure is distributed over the bulge.

The air can escape not only when it is heated up during operation of the brake, but also when the cap is being refolded, especially since the ribs stiffen the inwardly facing inner fold, making the cap easier to refold.

Finally, the bulge is fixed and the sealing zone is controlled because the flash on the mould parting line is outside the sealing zone.

According to another advantageous feature, the inner fold of the cap has a bulge and hollows.

The inner fold and therefore the cap is thus perfectly held in position on the piston while at the same time offering an air leakage passage from the annular gap of the caliper when this air is compressed under pressure as a result of its rise in temperature.

In a particularly advantageous manner, the bosses on the bulge consist of lugs.

According to another feature, the inner articulations are provided with studs to press against the bottom of the annular groove of the caliper while at the same time allowing air to pass between the studs.

The inner articulations are more specifically that side of the articulations that faces towards the bottom of the annular groove of the caliper. This then avoids flat-to-flat contacts between the articulations of the cap and this face of the annular groove of the caliper. Sealing is interrupted and the entire annular groove of the caliper is at the same pressure, namely a pressure close to the pressure outside.

On the outer side of the cap, which means in the region of the overmoulded insert, it is advantageous for there to be reinforcement by an insert in the form of a flat steel ring, equipped with holes, so that it can be completely enveloped with the material of the cap. This then achieves perfect attachment of the ring to the material of the cap, improving the seating of the cap in the annular groove of the caliper.

The operation of the cap is improved if at least one inwardly facing intermediate fold is provided with at least one longitudinal additional thickness on its side that faces towards the outside, and this additional thickness is parallel to the axis of the cap and the axis of the brake caliper that accepts this cap.

It is also advantageous for the cap to comprise at least one intermediate fold equipped near its inner articulation to the next fold with a local additional thickness, likewise directed longitudinally, on its side facing towards the inside, and this local additional thickness is preferably in a position that is the homologue of that of the longitudinal additional thickness of the fold.

Advantageously, the intermediate fold is equipped with several longitudinal additional thicknesses and local additional thicknesses in homologous positions, namely on either side of the fold, and these additional thicknesses are equiangularly distributed along the fold.

Finally and characteristically, the piston cap comprises:
- an inwardly facing inner fold, connected to an intermediate fold by an articulation and bordered by a bulge housed in the groove of the piston,
- an intermediate fold connected to a second intermediate fold by an articulation, and
- a second intermediate fold facing inwards and connected by an articulation to an outer fold,
- an outwardly facing outer fold articulated to an overmoulded insert by an articulation,
- an overmoulded insert to press against the outer wall of the annular groove of the caliper.

Another object of the invention is a disc brake equipped with a cap as defined hereinabove.

BRIEF DESCRIPTION OF THE DRAWINGS

The present invention may be described hereinafter in greater detail with the aid of one embodiment of a disc brake piston cap according to the invention which has been depicted in the attached drawings in which.

DETAILED DESCRIPTION

One subject of the invention is a disc brake piston cap housed between the caliper and the piston to separate the volume on the outside of the brake from the volume on the inside and to protect the piston.

The cap and the disc brake to which it is fitted will be described hereinafter.

Figure 1:
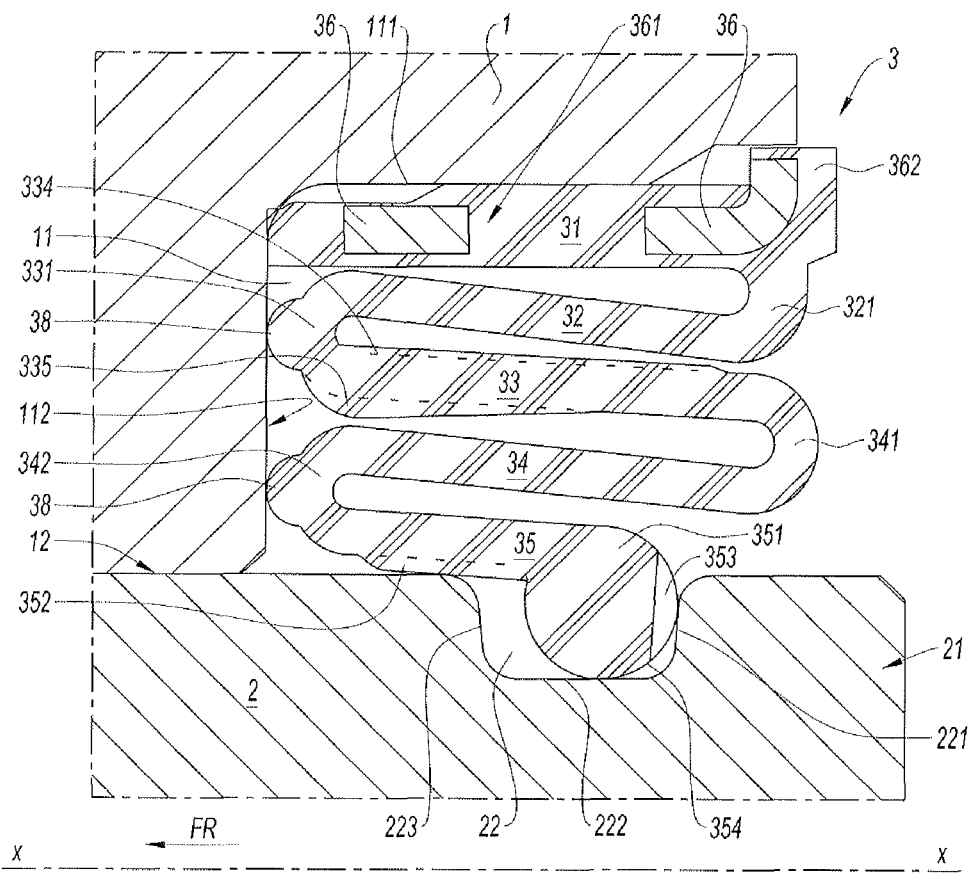
FIG. 1 is an axial half section of a brake caliper and of a brake piston in the folded position with a cap according to the invention.

FIG. 1 is an axial half section of the caliper 1 of the disc brake along the axis x-x of the piston 2 housed in the bore 12. The piston 2 is a cylindrical sleeve the front face 21 of which presses against the brake pad along an outline in the form of a circular annulus so as to push the pad against the brake disc. The brake disc and pad, neither depicted, are in the right-hand part of FIG. 1. The caliper 1 comprises an annular groove 11 accepting the cap 3 fixed to the piston 2 in a groove 22. The cap 3 has symmetry of revolution generated by rotating this section about the axis x-x.

Figure 2:
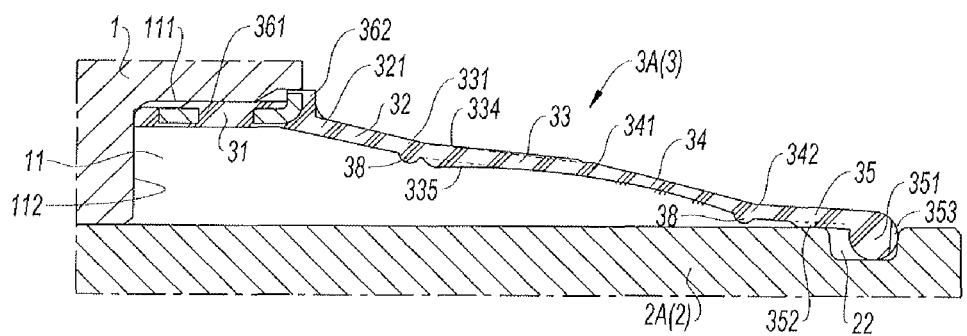
FIG. 2 is an axial half section of the piston cap according to the invention in the unfolded position.

In the fully deployed state according to FIG. 2, the cap 3 has a frustoconical overall shape 3A, the piston occupying the position 2A.

The cross section of the cap 3 in the free state or the cross section with which it was moulded essentially correspond to the shape of the cap installed between the caliper 1 and the piston 2 which is in the folded or partially folded state.

By convention, the outer side and the inner side are referenced with respect to the axis xx in the radial direction, the outer side being distant from the axis xx and the inner side being close to the axis xx.

Likewise by convention the inwardly facing direction is from the outside of the brake towards the inside in the direction of the arrow Fr of FIG. 1. The outwardly directed direction corresponds to the opposite direction, from the inside of the brake towards the outside when travelling along the cap from the bulge towards the overmoulded insert.

In the folded or partially folded state, the cap 3 is in the form of a bellows-style concertina-folded boot with successive folds described in the order from the inside of the cap 3 near the axis xx, namely:
- an inwardly facing inner fold 35, connected to an intermediate fold 34 by an articulation 342 and bordered by a bulge 351 housed in the groove 22 of the piston 2,
- an intermediate fold 34 connected to another intermediate fold 33 by an articulation 341, and
- a second intermediate fold 33 facing inwards and connected by an articulation 331 to an outer fold 32,
- an outwardly facing outer fold 32 articulated to an overmoulded insert 31 by an articulation 321,
- an overmoulded insert 31 to press against the outer wall 111 of the annular groove 11 of the caliper 1.

The inner fold 35 bearing the bulge 351 is inwardly facing, which means that it faces towards the inside of the groove 11 of the caliper 1 rather than towards the outside. In other words, the inner fold 35 is situated between the groove 22 of the piston 2 and the bottom 112 of the annular groove 11.

The overmoulded insert 31 is made up of an insert 36 in the form of a flat steel ring equipped with holes 361 and with a turned-up outer edge 362 so that the rubber of the cap 3 can fully envelop the insert 36. The crest of the two articulations 331, 342 respectively between the branches 32, 33 and 34, 35 is covered with groups of studs 38. The groups of studs 38 of each articulation are distributed equiangularly, for example at 45° at the periphery and the homologous groups on two articulations are situated on the same radii.

The fold 33 is reinforced on its two faces with the longitudinal additional thicknesses 334, 335, which run substantially parallel to the axis xx. The additional thickness 334 extends over a substantial part of the top side of the branch 33, while the additional thickness 335 is situated on the interior side of the articulation 331.

The additional thicknesses are evenly distributed in the peripheral direction of the cap and on each side of the fold and preferably lie in homologous positions, namely in the same axial plane.

On its face facing towards the piston 2, the inner fold 35 is stiffened by longitudinal ribs 352, which means by ribs that run in the direction of the axis x-x (or substantially in this direction) so that the inner fold 35 unfolds outwards practically not at all; the unfolding movement being assured by the intermediate folds 32, 33, 34. This then avoids the disadvantages of the known seals. The longitudinal ribs 352 create channels between the surface of the piston 2 and the inner fold 35, allowing air to pass.

The front face of the bulge 351 is provided with channels 353 that make it easier for air to pass when the bulge 351 is resting in the groove 22 of the piston 2.

The cap 3 according to the invention is fitted into the caliper 1 and onto the piston 2 as already described hereinabove, namely, the outer edge of the seal 3, which means the outer fold 31, is fixed to the caliper 1 and the inner edge is introduced via the bulge 351 into the groove 22 of the piston 2. The inner surface of the inner fold 35 may press against the surface of the piston 2 to a greater or lesser extent, beyond the groove 22, and the channels create passages in the direction of the axis x x allowing hot air under pressure to escape to the outside by passing through these gaps then into the groove 22 between the bottom 222 and the bulge 351 as it lifts as a result of the pressure.

Because the cap 3 or rear edge is pushed outwards under the effect of the pressure in the annular groove 11 of the caliper, the bulge 351 presses against the front side 221 of the groove 22; the notches 253 allow the air to pass because the bulge 351 is not in contact with the inner side 223 of the groove 22.

It should also be emphasized that the flash 354 on the parting line of the mould in which the cap 3 was manufactured lies in the corner between the bottom 222 and the front edge 221 of the groove 22 which means that any flash however uneven does not impair the sealing of the setup.

In the mould or on leaving the mould, the inner fold 35 is naturally inclined by around 45° with respect to the intermediate fold 34 so as to create, once fitted, an elastic force that pushes the bulge 351 into the bottom 222 of the groove 22.

The entirety of the annular groove 11 communicates with the outside because the articulations 331, 342 cannot press in a sealed manner against the bottom 112 of the groove 11 because of the studs 38 and because of the gaps they thus leave between them.

In conclusion, the cap 3 allows the annular groove 11 to be more or less equalized with atmospheric pressure when the air is compressed therein as the cap folds and/or when the volume of air is hot and under pressure.

The invention thus relates not only to the cap but also to the brake caliper of which the cap constitutes an important integral part.

The invention relates in general to braking systems equipped with disc brakes.

LIST OF KEY PARTS

Figure 3:
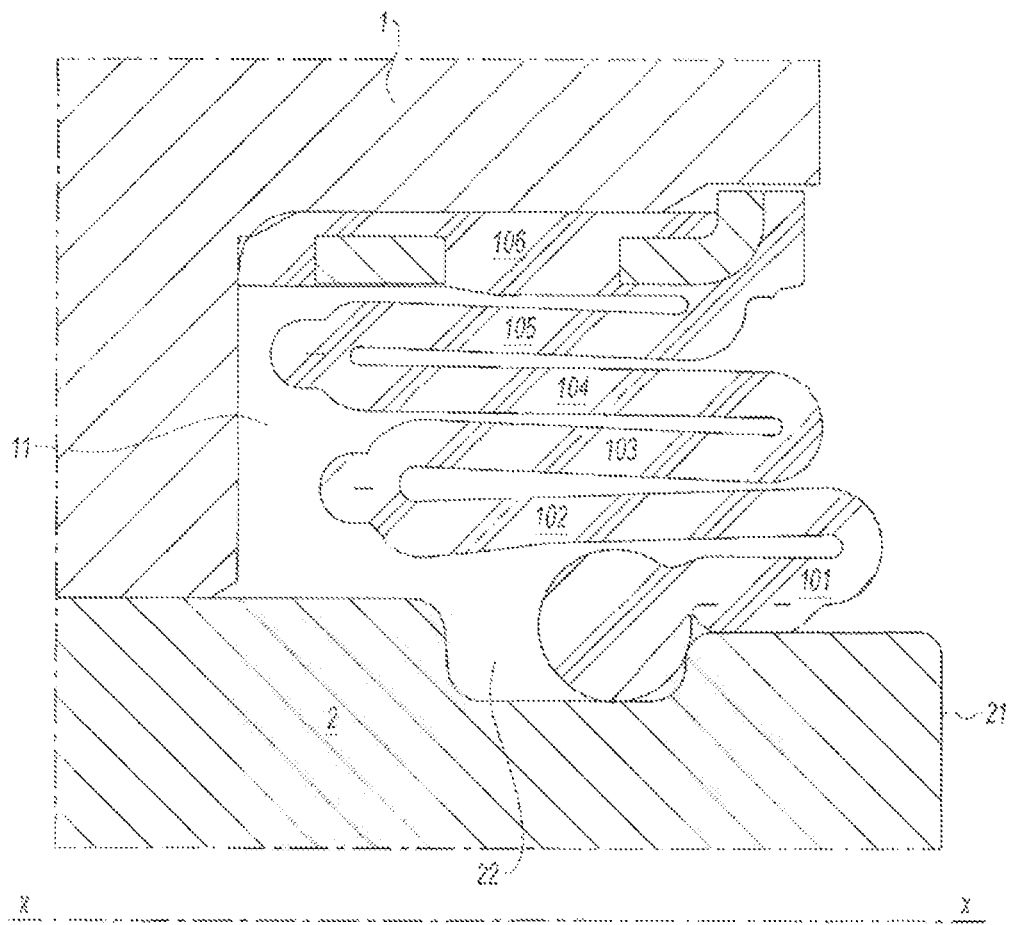
FIG. 3 is a cross section through a known piston cap.

1 Caliper
11 Annular groove
111 Outer wall
112 Bottom
12 Bore for the piston
2 Piston
21 Front face
22 Groove
221 Front edge of the groove
222 Bottom of the groove
223 Rear edge of the groove
3 Seal/cap
31 Overmoulded insert
32 Outer fold
321 Articulation
33 Intermediate fold
331 Articulation
34 Intermediate fold
341 Articulation
342 Articulation
35 Inner fold
351 Bulge
352 Longitudinal rib
353 Channels
354 Parting line flash
36 Insert
361 Hole
362 Outer edge
100 Known cap (FIG. 3)
101 Inner fold
102 Intermediate fold
103 Intermediate fold
104 Intermediate fold
105 Outer fold
Overmoulded insert

The invention claimed is:

1. A disc brake piston cap interposed between a caliper (1) and a piston (2) to protect the piston against attack, this cap being made up of a bellows-style concertina-folded boot having an outer edge and an inner edge to be housed in an annular groove (11) of the caliper (1) at a mouth of a bore (12) accommodating the piston (2), the outer edge of the cap being fixed to the caliper at an outer side (111) of the annular groove (11) and the inner edge of the cap being provided with a bulge housed in a groove (22) of the piston (2), the piston cap being characterized in that an inner fold (35) of the cap (3) is situated between the groove (22) of the piston (2) and the inside of the caliper (1), and has longitudinal ribs (352) on a surface of the cap, wherein the longitudinal ribs (352) are pressed against the piston (2) to allow air to pass between the ribs (352) and in that the inner fold (35) is connected by a first inner articulation (342) to a first outwardly facing intermediate fold (34), wherein the first outwardly facing intermediate fold (34) is connected by a first outer articulation (341) to an inwardly facing intermediate fold (33), wherein the inwardly facing intermediate fold (33) is connected by a second inner articulation (331), wherein the second inner articulation (331) is connected to a second outwardly facing outer fold (32), and the second outwardly facing outer fold (32) is connected by a second outer articulation (321) to an overmoulded insert (31), and the first and second inner articulations (331, 342) are equipped with studs (38) to press against the bottom (112) of the annular groove (11) of the caliper while allowing air to pass between the studs, wherein the longitudinal ribs permit air to freely exhaust from the annular groove while the longitudinal ribs contact the surface of the piston.

2. The brake piston cap according to claim 1, characterized in that the inner fold (35) of the cap (3) comprises channels (353) to press against the front edge (221) of the groove (22) of the piston (2).

3. The brake piston cap according to claim 1, characterized in that the overmoulded insert (31) consists of an insert (36) in the form of a flat steel ring provided with holes (361) so that the insert (36) can be completely enveloped with the material of the cap.

4. The brake piston cap according to claim 3, characterized in that the insert (36) is equipped with a turned-up outer edge (362).

5. The brake piston cap according to claim 1, characterized in that the inwardly facing intermediate fold (33) is provided with at least one longitudinal additional thickness (335) on an inner side of the inwardly facing intermediate fold (33), the at least one longitudinal additional thickness (335) being parallel to the axis (xx).

6. The brake piston cap according to claim 5, characterized in that the inwardly facing intermediate fold (33) is equipped with a local additional thickness (334) on an outer side near the first inner articulation, the local additional thickness being in a position that is the homologue of that of the longitudinal additional thickness (335).

7. The brake piston cap according to claim 6, characterized in that the inwardly facing intermediate fold (33) is equipped with longitudinal additional thicknesses (334) and with local additional thicknesses (335) that correspond to one another.

8. The brake piston cap according to claim 7, wherein the longitudinal additional thicknesses (334) and the local additional thicknesses (335) are equiangularly distributed along the inwardly facing intermediate fold (33).

9. The brake piston cap according to claim 1, characterized in that the inwardly facing intermediate fold (33) is equipped with a local additional thickness (334) on an outer side near the second inner articulation (331) and the second outwardly facing outer fold (32).

10. A brake piston cap interposed between a caliper (1) and a piston (2) to protect the piston against attack, the cap being made up of a bellows-style concertina-folded boot having an outer edge and an inner edge to be housed in an annular groove (11) of the caliper (1) at a mouth of a bore (12) accommodating the piston (2), the outer edge of the cap being fixed to the caliper at an outer side (111) of the annular groove (11) and the inner edge of the cap being provided with a bulge housed in a groove (22) of the piston (2), characterized in that the brake piston cap comprises:
   an inwardly facing inner fold (35), connected to a first intermediate fold (34) by a first inner articulation (342) and bordered by the bulge (351) housed in the groove (22) of the piston (2),
   a second intermediate fold (33) connected to the first intermediate fold (34) by a first outer articulation (341),
   a second inner articulation (331) connected to an outwardly facing outer fold (32) by the second intermediate fold (33),
   the outwardly facing outer fold (32) articulated to an overmoulded insert (31) by a second outer articulation (321),
   the overmoulded insert (31) to press against the outer wall (111) of the annular groove (11) of the caliper (1),
   longitudinal ribs (352) on a surface of the cap, wherein the longitudinal ribs (352) are pressed against the piston (2) to allow air to pass between the ribs (352),
   wherein the longitudinal ribs permit air to freely exhaust from the annular groove while the longitudinal ribs contact the surface of the piston.

11. A brake comprising a piston cap interposed between a caliper (1) and a piston (2) to protect the piston against attack, this cap being made up of a bellows-style concertina-folded boot having an outer edge and an inner edge to be housed in an annular groove (11) of the caliper (1) at a mouth of a bore (12) accommodating the piston (2), the outer edge of the cap being fixed to the caliper at an outer side (111) of the annular groove (11) and the inner edge of the cap being provided with a bulge housed in a groove (22) of the piston (2),
   the piston cap being characterized in that
      an inner fold (35) of the cap (3) is situated between the groove (22) of the piston (2) and the inside of the caliper (1), and has longitudinal ribs (352) on a surface of the cap, wherein the longitudinal ribs (352) are pressed against the piston (2) to allow air to pass between the ribs (352) and in that the inner fold (35) is connected by a first inner articulation (342) to a first outwardly facing intermediate fold (34), wherein the first outwardly facing intermediate fold (34) is connected by a first outer articulation (341) to an inwardly facing intermediate fold (33), wherein the inwardly facing intermediate fold (33) is connected by a second inner articulation (331), wherein the second inner articulation (331) is connected to a second outwardly facing outer fold (32), and the second outwardly facing outer fold (32) is connected by a second outer articulation (321) to an overmoulded insert (31), and
   the first and second inner articulations (331, 342) are equipped with studs (38) to press against the bottom (112) of the annular groove (11) of the caliper while allowing air to pass between the studs,
   wherein the longitudinal ribs permit air to freely exhaust from the annular groove while the longitudinal ribs contact the surface of the piston.

\* \* \* \* \*